I. F. KEPLER.
TRANSMISSION BELT.
APPLICATION FILED SEPT. 1, 1921.

1,425,021.

Patented Aug. 8, 1922.

Inventor
Irwin F. Kepler
By Robert McPherson
Atty.

UNITED STATES PATENT OFFICE.

IRWIN F. KEPLER, OF AKRON, OHIO, ASSIGNOR TO THE B. F. GOODRICH COMPANY, OF NEW YORK, N. Y., A CORPORATION OF NEW YORK.

TRANSMISSION BELT.

1,425,021.  Specification of Letters Patent.  Patented Aug. 8, 1922.

Application filed September 1, 1921. Serial No. 497,614.

*To all whom it may concern:*

Be it known that I, IRWIN F. KEPLER, a citizen of the United States, residing at Akron, in the county of Summit and State of Ohio, have invented a certain new and useful Transmission Belt, of which the following is a specification.

This invention relates to power transmission belts and more particularly to V-type or side-driving endless belts for automobile-motor fans and the like, and its principal objects are to promote the life and increase the flexing properties of such belts.

Figure 1:
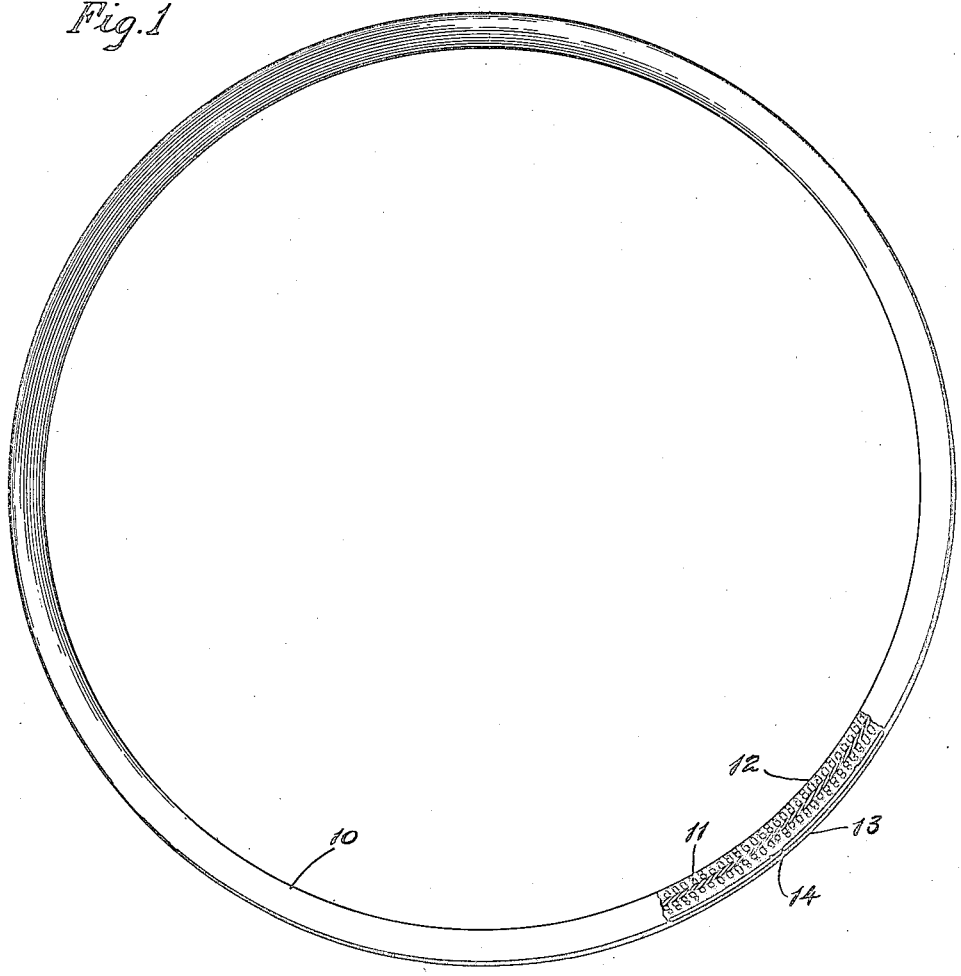

Fig. 1 of the accompanying drawing is a side view, partly in section, of a belt embodying my invention.

Figure 2:
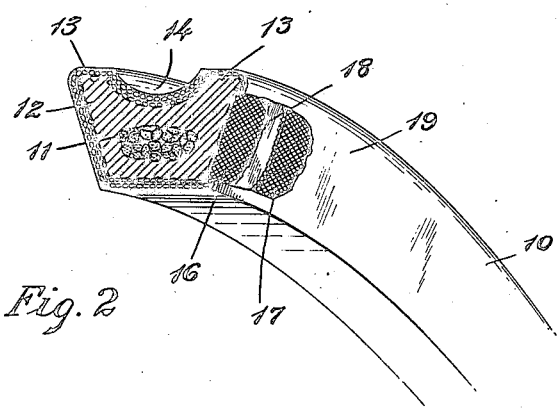

Fig. 2 is a perspective view, partly broken away, and in section, on a larger scale.

In the drawings, 10 is an annular transmission belt having approximately a V-shape in cross-section, the exact proportions of which may be varied according to the type of pulleys with which the belt is used and the method of manufacturing the belt. 11 is a substantially inextensible belt core comprising a series of cords assembled or cabled together in parallel courses and extending circumferentially of the belt, and a soft-rubber cushion or filler 12 which in the present case envelops the cord center and projects radially outward at the sides of the belt forming laterally-spaced, relatively narrow, continuous, resilient driving wings or flank portions 13 separated by a relatively-deep and wide circumferential groove or re-entrant portion 14 along the back of the belt. Surrounding the core are two layers of frictioned, bias fabric of which the layer 16 is the narrower one covering the inner peripheral and side portions respectively of the filler, and the outer layer 17 acts as a cover which envelops the inner layer of fabric and the filler and has its edge-portions overlapped in the groove 14. These fabric layers are provided with thin coatings 18, 19 of rubber and the whole structure is vulcanized together as a unit in a suitable mold.

Experience has shown that a prime factor in the life of fan and other high-speed belts is the heat generated by the rapid bending of the belt from its straightened position between pulley wheels to its curved position over a wheel and vice versa. The deep groove between the wings of my improved belt removes material from the back of the belt which would ordinarily have to stretch relatively to the inner periphery in passing around a pulley; it also increases the lateral flexibility of the belt so that the latter may more readily accommodate itself to the grooves of the pulleys, and it increases the cooling surface of the belt, all of which factors contribute to better running and longer life for the belt.

I do not confine myself to the details of construction here shown. In some instances I have successfully employed a deeper groove and a smaller rubber cushion, and have otherwise varied the construction while retaining the essential principle of the belt as herein described.

I claim:

An endless transmission belt of the side-driving or V-type, said belt having a core, a soft-rubber filler adjacent said core, and a fabric cover, all vulcanized together, and being formed with continuous side wings or flank portions separated by a relatively wide and deep, outer peripheral groove in the fabric cover and the rubber filler.

In witness whereof I have hereunto set my hand this 29th day of August, 1921.

IRWIN F. KEPLER.